United States Patent
Schalk-Schupp et al.

(10) Patent No.: US 10,481,831 B2
(45) Date of Patent: Nov. 19, 2019

(54) SYSTEM AND METHOD FOR COMBINED NON-LINEAR AND LATE ECHO SUPPRESSION

(71) Applicant: Nuance Communications, Inc., Burlington, MA (US)

(72) Inventors: Ingo Schalk-Schupp, Ulm (DE); Friedrich Faubel, Ulm (DE); Markus Buck, Biberach (DE); Naveen Kumar Desiraju, Ulm (DE); Tobias Wolff, Neu-Ulm (DE)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 124 days.

(21) Appl. No.: 15/722,367

(22) Filed: Oct. 2, 2017

(65) Prior Publication Data
US 2019/0102108 A1    Apr. 4, 2019

(51) Int. Cl.
*G06F 3/06* (2006.01)
*G06F 13/10* (2006.01)

(52) U.S. Cl.
CPC ............ *G06F 3/0659* (2013.01); *G06F 13/10* (2013.01)

(58) Field of Classification Search
CPC ....... G01H 17/00; G06F 3/0659; G06F 13/10; G10L 21/0224; G10L 21/0232; G10L 25/84; H04M 9/082; H04M 9/08; H04K 1/06
USPC ...................... 324/76.33; 345/440; 375/224; 379/406.08, 406.12; 381/23.1, 58, 66, 381/71.1, 71.6, 86, 94.2, 317, 303; 435/6.12; 455/67.11, 434, 440; 600/13, 600/500; 704/219, 226; 607/9
See application file for complete search history.

(56) References Cited

U.S. PATENT DOCUMENTS

| | | | | |
|---|---|---|---|---|
| 4,982,150 A | * | 1/1991 | Silverstein | G01R 23/16 324/76.33 |
| 5,943,429 A | * | 8/1999 | Handel | G10L 21/02 381/94.2 |
| 6,014,620 A | * | 1/2000 | Handel | G10L 25/48 704/219 |
| 6,136,541 A | * | 10/2000 | Gulati | B82Y 5/00 435/6.12 |
| 6,324,502 B1 | * | 11/2001 | Handel | G10L 21/0208 704/226 |

(Continued)

*Primary Examiner* — Gerald Gauthier
(74) *Attorney, Agent, or Firm* — Ohlandt, Greeley, Ruggiero & Perle, L.L.P.

(57) ABSTRACT

A method, computer program product, and computer system for receiving, by a computing device, an input signal. A first power spectral density estimate may be generated for a linear reverberant component associated with the input signal. A second power spectral density estimate may be generated for a non-linear reverberant component associated with the input signal. A power spectral density estimate may be generated by combining the first power spectral density estimate for the linear reverberant component and the second power spectral density estimate for the non-linear reverberant component. One or more parameters for at least one of the linear reverberant component and the non-linear reverberant component may be updated. One or more undesired signal components in an output signal resulting from the input signal may be reduced via residual echo suppression based upon, at least in part, updating the one or more parameters.

20 Claims, 13 Drawing Sheets

(56) References Cited

U.S. PATENT DOCUMENTS

| | | | | |
|---|---|---|---|---|
| 6,564,184 B1* | 5/2003 | Eriksson | G10L 21/0208 | 704/222 |
| 2005/0063536 A1* | 3/2005 | Myllyla | H04M 9/082 | 379/406.08 |
| 2006/0115095 A1* | 6/2006 | Giesbrecht | H04M 9/08 | 381/66 |
| 2006/0129389 A1* | 6/2006 | Den Brinker | G10L 19/06 | 704/219 |
| 2010/0274308 A1* | 10/2010 | Scott | A61N 1/36135 | 607/9 |
| 2011/0004470 A1* | 1/2011 | Konchitsky | G10L 21/0208 | 704/226 |
| 2011/0034168 A1* | 2/2011 | Lindoff | H04J 11/0086 | 455/434 |
| 2011/0044462 A1* | 2/2011 | Yoshioka | | 381/66 |
| 2011/0045781 A1* | 2/2011 | Shellhammer | H04B 17/26 | 455/67.11 |
| 2011/0305345 A1* | 12/2011 | Bouchard | G10L 21/0208 | 381/23.1 |
| 2012/0308036 A1* | 12/2012 | Christoph | H03G 3/32 | 381/86 |
| 2013/0028306 A1* | 1/2013 | Seibert | H04L 27/0012 | 375/224 |
| 2013/0093770 A1* | 4/2013 | Loewenstein | G01R 29/26 | 345/440 |
| 2013/0165734 A1* | 6/2013 | Butters | A61N 2/002 | 600/13 |
| 2013/0196670 A1* | 8/2013 | Kim | H04W 36/0083 | 455/440 |
| 2014/0140555 A1* | 5/2014 | Pilgrim | H04R 25/407 | 381/317 |
| 2014/0177859 A1* | 6/2014 | Ahgren | H04M 9/082 | 381/71.1 |
| 2015/0023509 A1* | 1/2015 | Devantier | H04R 29/001 | 381/58 |
| 2015/0065896 A1* | 3/2015 | Takahashi | A61B 5/721 | 600/500 |
| 2015/0124987 A1* | 5/2015 | Hazrati | H04R 25/453 | 381/66 |
| 2015/0223002 A1* | 8/2015 | Mehta | H04S 7/30 | 381/303 |
| 2016/0196818 A1* | 7/2016 | Christoph | H04S 7/301 | 381/71.6 |
| 2016/0341598 A1* | 11/2016 | Van Baren | G01M 7/025 | |
| 2017/0053667 A1* | 2/2017 | Wolff | G10L 21/0208 | |
| 2017/0287502 A1* | 10/2017 | Buck | G10L 21/0208 | |
| 2018/0308503 A1* | 10/2018 | Kaskari | G10L 21/038 | |
| 2018/0367674 A1* | 12/2018 | Schalk-Schupp | H04M 9/082 | |
| 2019/0080709 A1* | 3/2019 | Wolff | G01H 7/00 | |
| 2019/0102108 A1* | 4/2019 | Schalk-Schupp | G06F 3/0659 | |
| 2019/0140766 A1* | 5/2019 | Anlage | H04K 3/62 | |

* cited by examiner

SYSTEM AND METHOD FOR COMBINED NON-LINEAR AND LATE ECHO SUPPRESSION

BACKGROUND

Generally, speech continues to gain importance in human-machine interaction. At the same time, speech enabled devices may turn into mass produced consumer electronic devices. Non-linear system behavior may be expected in the space of, e.g., voice controlled consumer electronic devices, since manufacturers may tend to deploy low-cost hardware devices (e.g., amplifiers or loudspeakers). The acoustic environments where the devices may be used may be rather reverberant. In order to improve robust speech enhancement in these situations, it may be beneficial to optimize the cancellation of acoustic echoes, since acoustic eco control/cancellation (AEC) may be a core component of most speech communication devices.

BRIEF SUMMARY OF DISCLOSURE

In one example implementation, a method, performed by one or more computing devices, may include but is not limited to receiving, by a computing device, an input signal. A first power spectral density estimate may be generated for a linear reverberant component associated with the input signal. A second power spectral density estimate may be generated for a non-linear reverberant component associated with the input signal. A power spectral density estimate may be generated by combining the first power spectral density estimate for the linear reverberant component and the second power spectral density estimate for the non-linear reverberant component. One or more parameters for at least one of the linear reverberant component and the non-linear reverberant component may be updated. One or more undesired signal components in an output signal resulting from the input signal may be reduced via residual echo suppression based upon, at least in part, updating the one or more parameters.

One or more of the following example features may be included. Updating the one or more parameters may include alternating updates of the one or more parameters between two frames. Updating the one or more parameters may include alternating updates of the one or more parameters in one frame. Updating the one or more parameters may include comparing two or more power spectral density errors and utilizing a power spectral density error of the two or more power spectral density errors resulting in a larger improvement of the output signal. At least one parameter of the one or more parameters may be used to generate the first power spectral density estimate for the linear reverberant component and to generate the second power spectral density estimate for the non-linear reverberant component. Adaptation of an acoustic echo cancellation filter may cease when the one or more undesired signal components are present. A power ratio between the linear reverberant component and the estimate for the non-linear reverberant component may be utilized as control information.

In another example implementation, a computing system may include one or more processors and one or more memories configured to perform operations that may include but are not limited to receiving an input signal. A first power spectral density estimate may be generated for a linear reverberant component associated with the input signal. A second power spectral density estimate may be generated for a non-linear reverberant component associated with the input signal. A power spectral density estimate may be generated by combining the first power spectral density estimate for the linear reverberant component and the second power spectral density estimate for the non-linear reverberant component. One or more parameters for at least one of the linear reverberant component and the non-linear reverberant component may be updated. One or more undesired signal components in an output signal resulting from the input signal may be reduced via residual echo suppression based upon, at least in part, updating the one or more parameters.

One or more of the following example features may be included. Updating the one or more parameters may include alternating updates of the one or more parameters between two frames. Updating the one or more parameters may include alternating updates of the one or more parameters in one frame. Updating the one or more parameters may include comparing two or more power spectral density errors and utilizing a power spectral density error of the two or more power spectral density errors resulting in a larger improvement of the output signal. At least one parameter of the one or more parameters may be used to generate the first power spectral density estimate for the linear reverberant component and to generate the second power spectral density estimate for the non-linear reverberant component. Adaptation of an acoustic echo cancellation filter may cease when the one or more undesired signal components are present. A power ratio between the linear reverberant component and the estimate for the non-linear reverberant component may be utilized as control information.

In another example implementation, a computer program product may reside on a computer readable storage medium having a plurality of instructions stored thereon which, when executed across one or more processors, may cause at least a portion of the one or more processors to perform operations that may include but are not limited to receiving an input signal. A first power spectral density estimate may be generated for a linear reverberant component associated with the input signal. A second power spectral density estimate may be generated for a non-linear reverberant component associated with the input signal. A power spectral density estimate may be generated by combining the first power spectral density estimate for the linear reverberant component and the second power spectral density estimate for the non-linear reverberant component. One or more parameters for at least one of the linear reverberant component and the non-linear reverberant component may be updated. One or more undesired signal components in an output signal resulting from the input signal may be reduced via residual echo suppression based upon, at least in part, updating the one or more parameters.

One or more of the following example features may be included. Updating the one or more parameters may include alternating updates of the one or more parameters between two frames. Updating the one or more parameters may include alternating updates of the one or more parameters in one frame. Updating the one or more parameters may include comparing two or more power spectral density errors and utilizing a power spectral density error of the two or more power spectral density errors resulting in a larger improvement of the output signal. At least one parameter of the one or more parameters may be used to generate the first power spectral density estimate for the linear reverberant component and to generate the second power spectral density estimate for the non-linear reverberant component. Adaptation of an acoustic echo cancellation filter may cease when the one or more undesired signal components are present. A power ratio between the linear reverberant component and the estimate for the non-linear reverberant component may be utilized as control information.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
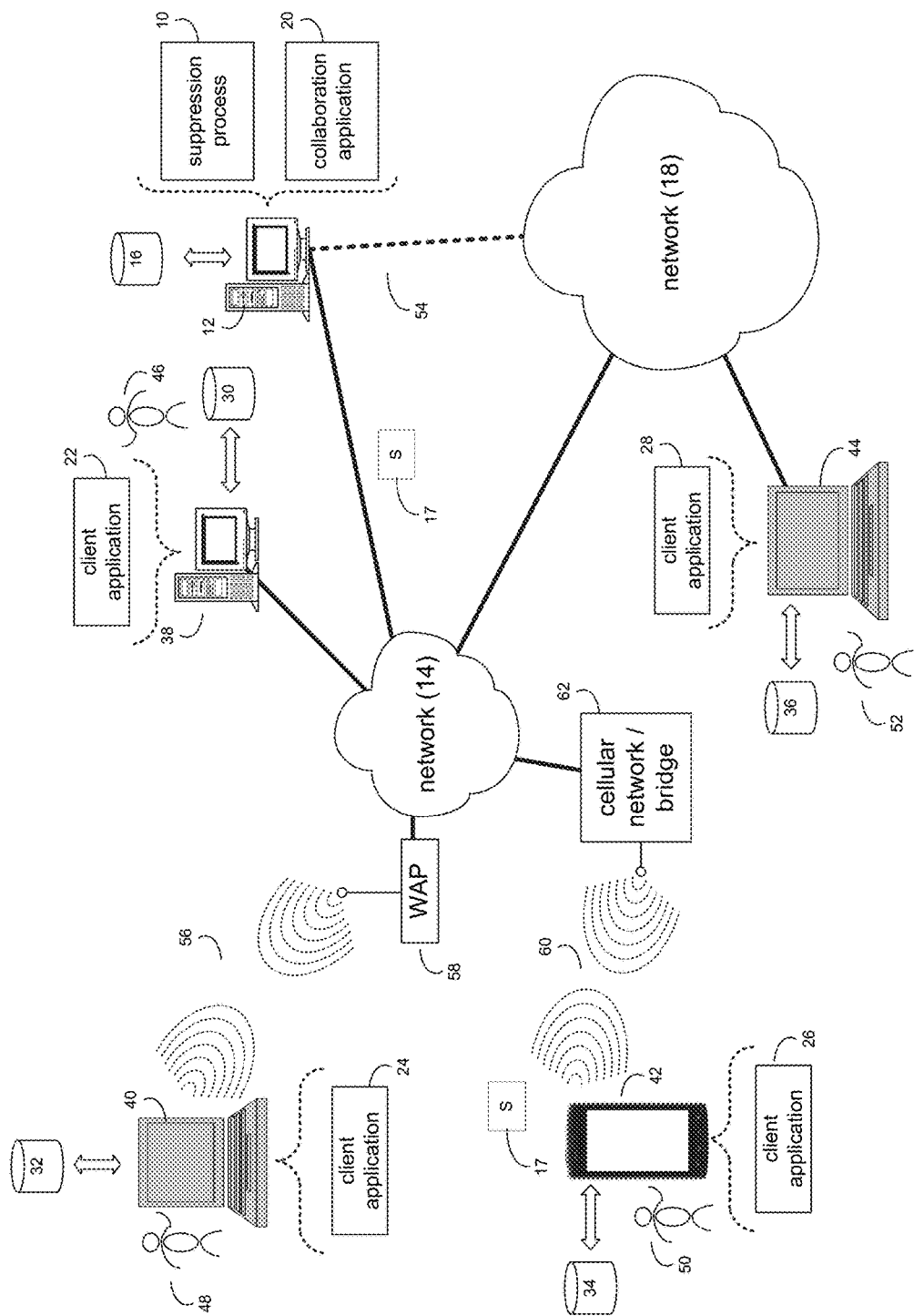
FIG. 1 is an example diagrammatic view of a suppression process coupled to an example distributed computing network according to one or more example implementations of the disclosure.

System Overview:

Generally, as noted above, speech continues to gain importance in human-machine interaction. At the same time, speech enabled devices may turn into mass produced consumer electronic devices. Non-linear system behavior may be expected in the space of, e.g., voice controlled consumer electronic devices, since manufacturers may tend to deploy low-cost hardware devices (e.g., amplifiers or loudspeakers). The acoustic environments where the devices may be used may be rather reverberant. In order to improve robust speech enhancement in these situations, it may be beneficial to optimize the cancellation of acoustic echoes, since acoustic eco control/cancellation (AEC) may be a core component of most speech communication devices.

AEC may be a key processing feature for many speech applications, such as automated speech recognition (ASR) with, e.g., hand held or hands-free telephony. State-of-the-art solutions may generally apply a combination of AEC and residual echo suppression (RES) techniques. However, problems may arise when non-linear and linear algorithms are run concurrently on a device that exhibits frequent undesired signal components. In such an example implementation, the interactions between both adaptation domains may usually lead to significant parameter mis-estimation, resulting in severe signal quality degradation even in time segments without undesired signal components.

Known methods to deal with this situation may rely on the assumption that the linear parameters may be identified independently from the non-linear parameters before any non-linear undesired signal components occur. However, this may not hold for all systems and may result in severe performance degradation when undesired signal components are encountered. In implementations with frequent undesired signal component occurrences, the linear parameters (such as the room impulse response (RIR) and the late-echo estimation (LEE) parameters) and the non-linear parameters (such as the clipping threshold) should generally be identified concurrently. This may create interactions that generally cannot be resolved by a straightforward combination of known methods. However, as will be discussed below, use of suppression process 10 may resolve this issue.

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown suppression process 10 that may reside on and may be executed by a computer (e.g., computer 12), which may be connected to a network (e.g., network 14) (e.g., the internet or a local area network). Examples of computer 12 (and/or one or more of the client electronic devices noted below and/or any suitable device that includes a microphone, speaker/loudspeaker, etc.) may include, but are not limited to, a storage system (e.g., a Network Attached Storage (NAS) system, a Storage Area Network (SAN)), a personal computer(s), a laptop computer(s), mobile computing device(s), a social network server, a text message server, a photo server, a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a suppression process, such as suppression process 10 of FIG. 1, may receive an input signal (e.g., input signal 17). A first power spectral density estimate may be generated for a linear reverberant component associated with the input signal. A second power spectral density estimate may be generated for a non-linear reverberant component associated with the input signal. A power spectral density estimate may be generated by combining the first power spectral density estimate for the linear reverberant component and the second power spectral density estimate for the non-linear reverberant component. One or more parameters for at least one of the linear reverberant component and the non-linear reverberant component may be updated. One or more undesired signal components in an output signal resulting from the input signal may be reduced via residual echo suppression based upon, at least in part, updating the one or more parameters.

In some implementations, the instruction sets and subroutines of suppression process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility", as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, suppression process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a speech recognition application (e.g., speech recognition application 20), examples of which may include, but are not limited to, e.g., an automatic speech recognition application, a video conferencing application, a voice-over-IP application, a video-over-IP application, an Instant Messaging (IM)/"chat" application, a short messaging service (SMS)/multimedia messaging service (MMS) application, or other application that allows for virtual meeting and/or remote collaboration and/or recognition/translation of spoken language into text by computing devices. In some implementations, suppression process 10 and/or speech recognition application 20 may be accessed via one or more of client applications 22, 24, 26, 28. In some implementations, suppression process 10 may be a standalone application, or may be an applet/application/script/extension that may interact with and/or be executed within speech recognition application 20, a component of speech recognition application 20, and/or one or more of client applications 22, 24, 26, 28. In some implementations, speech recognition application 20 may be a standalone application, or may be an applet/application/script/extension that may interact with and/or be executed within suppression process 10, a component of suppression process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of suppression process 10 and/or speech recognition application 20. Examples of client applications 22, 24, 26, 28 may include, but are not limited to, e.g., an automatic speech recognition application, a video conferencing application, a voice-over-IP application, a video-over-IP application, an Instant Messaging (IM)/"chat" application, a short messaging service (SMS)/multimedia messaging service (MMS) application, or other application that allows for virtual meeting and/or remote collaboration and/or recognition/translation of spoken language into text by computing devices, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of suppression process 10 (and vice versa). Accordingly, in some implementations, suppression process 10 may be a purely server-side application, a purely client-side application, or a hybrid server-side/client-side application that is cooperatively executed by one or more of client applications 22, 24, 26, 28 and/or suppression process 10.

In some implementations, one or more of client applications 22, 24, 26, 28 may be configured to effectuate some or all of the functionality of speech recognition application 20 (and vice versa). Accordingly, in some implementations, speech recognition application 20 may be a purely server-side application, a purely client-side application, or a hybrid server-side/client-side application that is cooperatively executed by one or more of client applications 22, 24, 26, 28 and/or speech recognition application 20. As one or more of client applications 22, 24, 26, 28, suppression process 10, and speech recognition application 20, taken singly or in any combination, may effectuate some or all of the same functionality, any description of effectuating such functionality via one or more of client applications 22, 24, 26, 28, suppression process 10, speech recognition application 20, or combination thereof, and any described interaction(s) between one or more of client applications 22, 24, 26, 28, suppression process 10, speech recognition application 20, or combination thereof to effectuate such functionality, should be taken as an example only and not to limit the scope of the disclosure.

In some implementations, one or more of users 46, 48, 50, 52 may access computer 12 and suppression process 10 (e.g., using one or more of client electronic devices 38, 40, 42, 44) directly through network 14 or through secondary network 18. Further, computer 12 may be connected to network 14 through secondary network 18, as illustrated with phantom link line 54. Suppression process 10 may include one or more user interfaces, such as browsers and textual or graphical user interfaces, through which users 46, 48, 50, 52 may access suppression process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
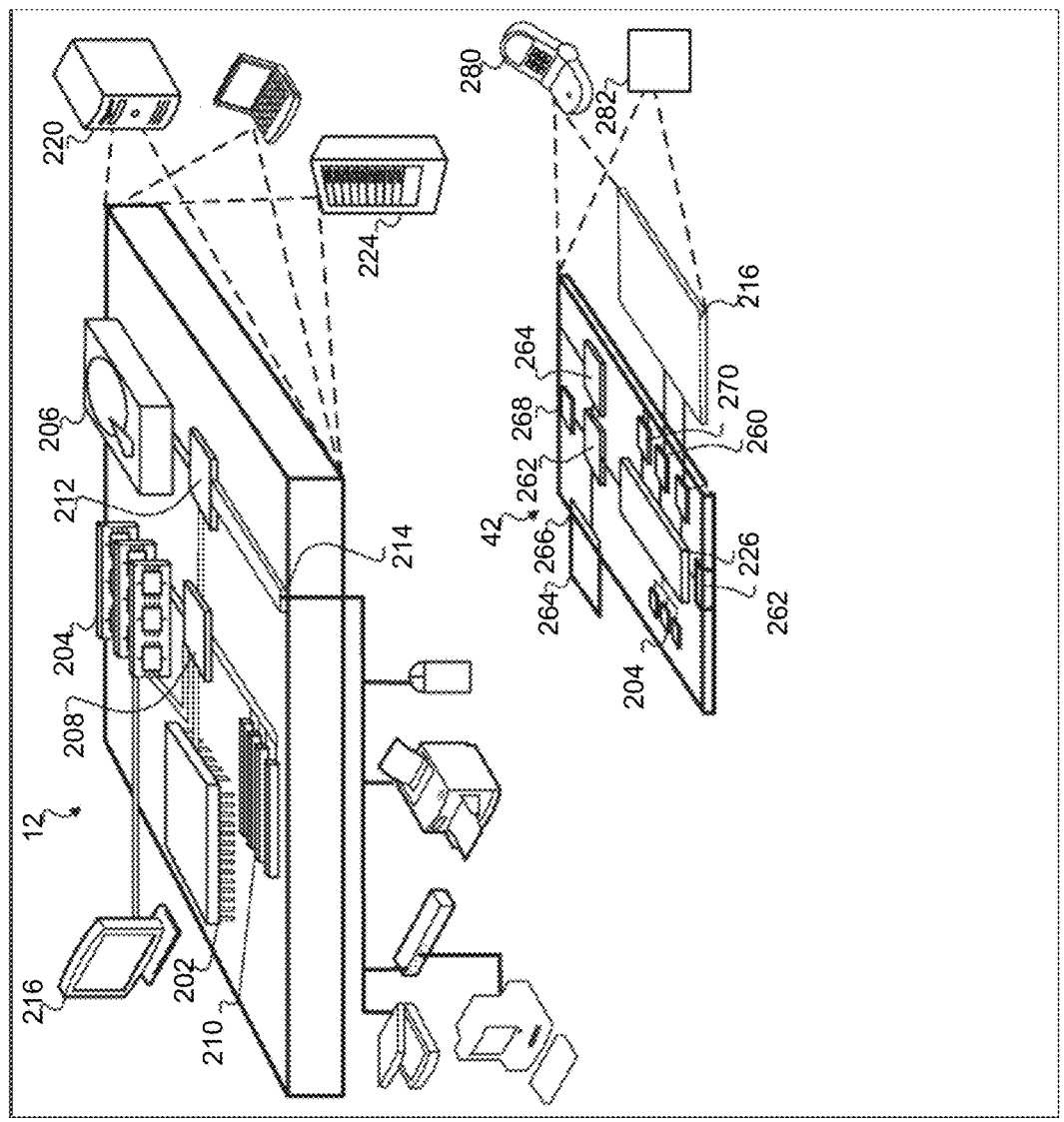
FIG. 2 is an example diagrammatic view of a computer and client electronic device of FIG. 1 according to one or more example implementations of the disclosure.
Figure 3:
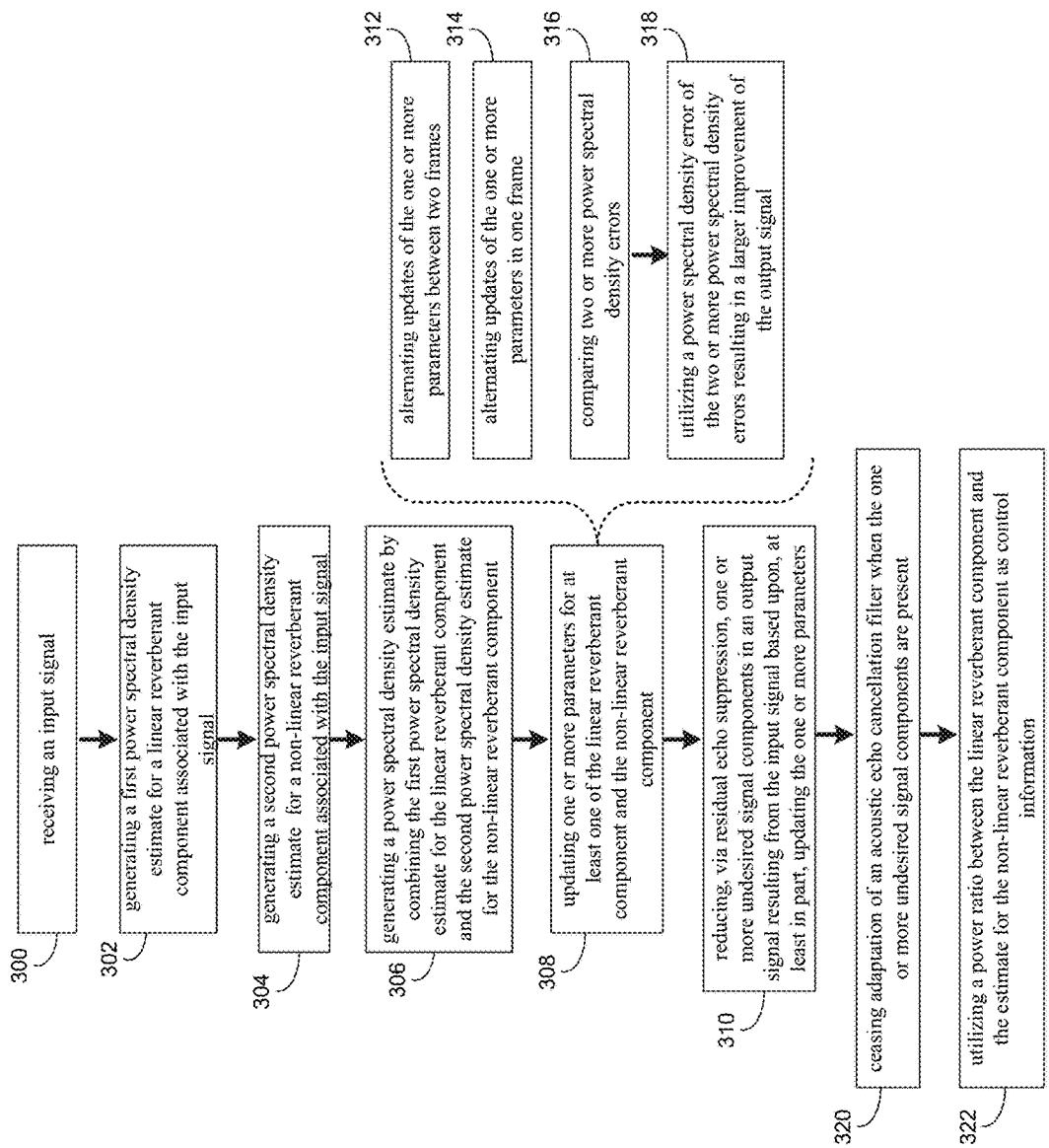
FIG. 3 is an example flowchart of a suppression process according to one or more example implementations of the disclosure.

Referring also to the example implementation of FIG. 2, there is shown a diagrammatic view of computer 12 and client electronic device 42. While client electronic device 42 and computer 12 are shown in this figure, this is for example purposes only and is not intended to be a limitation of this disclosure, as other configurations are possible. Additionally, any computing device capable of executing, in whole or in part, suppression process 10 may be substituted for client electronic device 42 and computer 12 (in whole or in part) within FIG. 2, examples of which may include but are not limited to one or more of client electronic devices 38, 40, and 44. Client electronic device 42 and/or computer 12 may also include other devices, such as televisions with one or more processors embedded therein or attached thereto as well as any of the microphones, microphone arrays, and/or speakers described herein. The components shown here, their connections and relationships, and their functions, are meant to be examples only, and are not meant to limit implementations of the disclosure described.

In some implementations, computer 12 may include processor 202, memory 204, storage device 206, a high-speed interface 208 connecting to memory 204 and high-speed expansion ports 210, and low speed interface 212 connecting to low speed bus 214 and storage device 206. Each of the components 202, 204, 206, 208, 210, and 212, may be interconnected using various busses, and may be mounted on a common motherboard or in other manners as appropriate. The processor 202 can process instructions for execution within the computer 12, including instructions stored in the memory 204 or on the storage device 206 to display graphical information for a GUI on an external input/output device, such as display 216 coupled to high speed interface 208. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

Memory 204 may store information within the computer 12. In one implementation, memory 204 may be a volatile memory unit or units. In another implementation, memory 204 may be a non-volatile memory unit or units. The memory 204 may also be another form of computer-readable medium, such as a magnetic or optical disk.

Storage device 206 may be capable of providing mass storage for computer 12. In one implementation, the storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204, the storage device 206, memory on processor 202, or a propagated signal.

High speed controller 208 may manage bandwidth-intensive operations for computer 12, while the low speed controller 212 may manage lower bandwidth-intensive operations. Such allocation of functions is exemplary only. In one implementation, the high-speed controller 208 may be coupled to memory 204, display 216 (e.g., through a graphics processor or accelerator), and to high-speed expansion ports 210, which may accept various expansion cards (not shown). In the implementation, low-speed controller 212 is coupled to storage device 206 and low-speed expansion port 214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computer 12 may be implemented in a number of different forms, as shown in the figure. For example, computer 12 may be implemented as a standard server 220, or multiple times in a group of such servers. It may also be implemented as part of a rack server system 224. Alternatively, components from computer 12 may be combined with other components in a mobile device (not shown), such as client electronic device 42. Each of such devices may contain one or more of computer 12, client electronic device 42, and an entire system may be made up of multiple computing devices communicating with each other.

Client electronic device 42 may include processor 226, memory 204, an input/output device such as display 216, a communication interface 262, and a transceiver 264, among other components. Client electronic device 42 may also be provided with a storage device, such as a microdrive or other device, to provide additional storage. Each of the components 226, 204, 216, 262, and 264, may be interconnected using various buses, and several of the components may be mounted on a common motherboard or in other manners as appropriate.

Processor 226 may execute instructions within client electronic device 42, including instructions stored in the memory 204. The processor may be implemented as a chipset of chips that include separate and multiple analog and digital processors. The processor may provide, for example, for coordination of the other components of client electronic device 42, such as control of user interfaces, applications run by client electronic device 42, and wireless communication by client electronic device 42.

In some embodiments, processor 226 may communicate with a user through control interface 258 and display interface 260 coupled to a display 216. The display 216 may be, for example, a TFT LCD (Thin-Film-Transistor Liquid Crystal Display) or an OLED (Organic Light Emitting Diode) display, or other appropriate display technology. The display interface 260 may comprise appropriate circuitry for driving the display 216 to present graphical and other information to a user. The control interface 258 may receive commands from a user and convert them for submission to the processor 226. In addition, an external interface 262 may be provide in communication with processor 226, so as to enable near area communication of client electronic device 42 with other devices. External interface 262 may provide, for example, for wired communication in some implementations, or for wireless communication in other implementations, and multiple interfaces may also be used.

In some embodiments, memory 204 may store information within the Client electronic device 42. The memory 204 can be implemented as one or more of a computer-readable medium or media, a volatile memory unit or units, or a non-volatile memory unit or units. Expansion memory 264 may also be provided and connected to client electronic device 42 through expansion interface 266, which may include, for example, a SIMM (Single In Line Memory Module) card interface. Such expansion memory 264 may provide extra storage space for client electronic device 42, or may also store applications or other information for client electronic device 42. Specifically, expansion memory 264 may include instructions to carry out or supplement the processes described above, and may include secure information also. Thus, for example, expansion memory 264 may be provide as a security module for client electronic device 42, and may be programmed with instructions that permit secure use of client electronic device 42. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 204, expansion memory 264, memory on processor 226, or a propagated signal that may be received, for example, over transceiver 264 or external interface 262.

Client electronic device 42 may communicate wirelessly through communication interface 262, which may include digital signal processing circuitry where necessary. Communication interface 262 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 264. In addition, short-range communication may occur, such as using a Bluetooth, WiFi, or other such transceiver (not shown). In addition, GPS (Global Positioning System) receiver module 268 may provide additional navigation and location-related wireless data to client electronic device 42, which may be used as appropriate by applications running on client electronic device 42.

Client electronic device 42 may also communicate audibly using audio codec 270, which may receive spoken information from a user and convert it to usable digital information. Audio codec 270 may likewise generate audible sound for a user, such as through a speaker, e.g., in a handset of client electronic device 42. Such sound may include sound from voice telephone calls, may include recorded sound (e.g., voice messages, music files, etc.) and may also include sound generated by applications operating on client electronic device 42.

Client electronic device 42 may be implemented in a number of different forms, as shown in the figure. For example, it may be implemented as a cellular telephone 280. It may also be implemented as part of a smartphone 282, personal digital assistant, remote control, or other similar mobile device.

In implementations with frequent undesired signal component occurrences (e.g., within cars), the linear parameters (such as room impulse response (RIR) and the late-echo estimation (LEE) parameters) and the non-linear parameters (such as the clipping threshold) should generally be identified concurrently. This may create interactions that generally cannot be resolved by a straightforward combination of known methods. However, as will be discussed below, use of suppression process 10 may resolve this issue.

The concurrent adaptation of linear and non-linear parameters may extend the range of applications of non-linear echo suppression to a wide field of devices. The setups combining non-linear echo suppression with late-echo suppression may improve the compromise between late linear and non-linear echo suppression performance on the one hand, and may invest calculation power on the other hand in a configurable manner.

The introduced techniques of suppression process 10 may be particularly relevant in, e.g., typical internet-of-things applications, where audio hardware components may tend to be even cheaper than those in automobiles, which may lead to more frequent undesired signal components, and which may be commonly used in strongly reverberant environments as compared to a car cabin, which may cause increased late echo.

In some implementations, the present disclosure may also alleviate computation power requirements in typical environments (e.g., car environments) without a loss in echo suppression performance. Computation power cuttings may be important as customer expectations for innovative high-quality audio systems increase, whereas available hardware resources may not.

Generally, known solutions may show adaptation lags at each undesired signal component onset and offset, or may take a notably long time to adapt a more complex system. In some implementations, by contrast, suppression process 10 may instead store and re-uses long-term information on the undesired signal component threshold and thus exhibit a distinctive adaptation behavior.

As will be discussed below, suppression process 10 may at least help, e.g., improve of speech recognition technology, necessarily rooted in computer technology in order to overcome an example and non-limiting problem specifically arising in the realm of automated speech recognition), and improve existing technological processes associated with the same.

As will also be discussed below, suppression process 10 may control the interaction between linear and non-linear adaptation through, e.g., approximating both linear and non-linear parameters, which while this may not result in "good" signal quality, may allow for rough distinction between time segments with undesired signal components and those without undesired signal components. This information may be extracted from the non-linear power spectral density (PSD) estimation and used to inhibit adaptation of the linear parameters in segments with undesired signal components. Thus, the linear parameters may be correctly identified, which in turn may lead to a better approximation of the non-linear parameters. Moreover, the addition of a model of late echo and the identification of late echo parameters may allow the use of a shorter RIR filter length, which may save computational power without degrading the quality of the linear echo suppression. At the same time, late non-linearly distorted echo components may also be suppressed, which may not be the case in known methods before.

It should be noted that the adaptation strategies described below may introduce an example and non-limiting synergetic advantage, that since non-linearities generate spectral components that are not present in the reference PSD, the parameters of the linear system may receive updates in spectral regions where the linear system alone generally could not perform an update due to missing excitation. Moreover, the disclosed adaptation principle(s) is related to the so-called "expectation maximization" algorithm known from statistical optimization of mixture models. There, the expectation step estimates the values of the "hidden" variables, given the latest estimate for the desired parameters, while the maximization step maximizes the likelihood of the parameters to be estimated, given the latest estimate of the hidden variables. In the present context of residual echo suppression, the disclosed adaptation rule(s) may be unique, as it allows for optimization of a new processing structure.

The Suppression Process:

As discussed above and referring also at least to the example implementations of FIGS. 3-13, suppression process (SP) 10 may receive 300 an input signal. Suppression process 10 may generate 302 a first power spectral density estimate for a linear reverberant component associated with the input signal. Suppression process 10 may generate 304 a second power spectral density estimate for a non-linear reverberant component associated with the input signal. Suppression process 10 may generate 306 a power spectral density estimate by combining the first power spectral density estimate for the linear reverberant component and the second power spectral density estimate for the non-linear reverberant component. Suppression process 10 may update 308 one or more parameters for at least one of the linear reverberant component and the non-linear reverberant component. Suppression process 10 may reduce 310, via residual echo suppression, one or more undesired signal components in an output signal resulting from the input signal based upon, at least in part, updating the one or more parameters.

In some implementations, suppression process (SP) 10 may receive 300 an input signal. For instance, assume for example purposes only that a user (e.g., user 50) is in an environment (e.g., a car). In the example, one or more microphones of client electronic device 42 (and/or internal car microphones) may be used to receive 300 an input signal, such as input signal 17, from user 50, which may include, e.g., a verbal speech signal, an acoustic signal, etc. It will be appreciated that other client electronic devices, as well as computer 12, may also receive 300 the input (e.g., directly or via client electronic device 42).

Generally, SP 10 may receive 300 both a reference signal (which at the same time may be sent to a loudspeaker) and a microphone signal, which may both be considered as "input" signals. The reference signal may provide vital information about the microphone signal. The microphone signal may contain echo, which may consist of linear echo and possibly nonlinear echo. Known echo cancellers may remove the linear part, but late echo may still remain due to, e.g., a short filter length. Moreover, all non-linear echo components (both early and late) may remain. As will be discussed below, SP 10 may aim to reduce all the remaining echo components. Generally, the non-linear components may be called undesired signal components, but not the linear components.

As will be discussed below, SP 10 may use acoustic echo control/cancellation (AEC) combined with residual echo suppression (RES), which may uniquely improve suppression of acoustic feedback (e.g., residual echoes) from, e.g., loudspeakers. While solutions for residual echo suppression in reverberant spaces may exist, as well as separate solutions that may improve system performance when, e.g., loudspeakers with non-linear transmission characteristics are involved, the two solutions are generally unable to be combined, for reasons discussed throughout. However, in some implementations, SP 10 may actually be able utilize a combined system approach in order to handle, e.g., non-linear undesired signal components in reverberant spaces, as well as other undesired signal component scenarios, to obtain better results than if the two approaches were both used separately.

Generally, regarding AEC, SP 10 may use speech enhancement to clean up microphone signals that may be disturbed by interfering noise. A special kind of interference may arise from acoustic loudspeaker signals that couple back into the microphone. These signals may be emitted by the loudspeaker as acoustic waves that propagate through the air, including multiple reflections at room boundaries and obstacles. The acoustic waves may reach the microphone via different paths, where each path may exhibit a certain delay, attenuation and direction of arrival at the microphone. The multiple paths may be superimposed with the desired speech signal and other signal components at the microphone.

Figure 4:
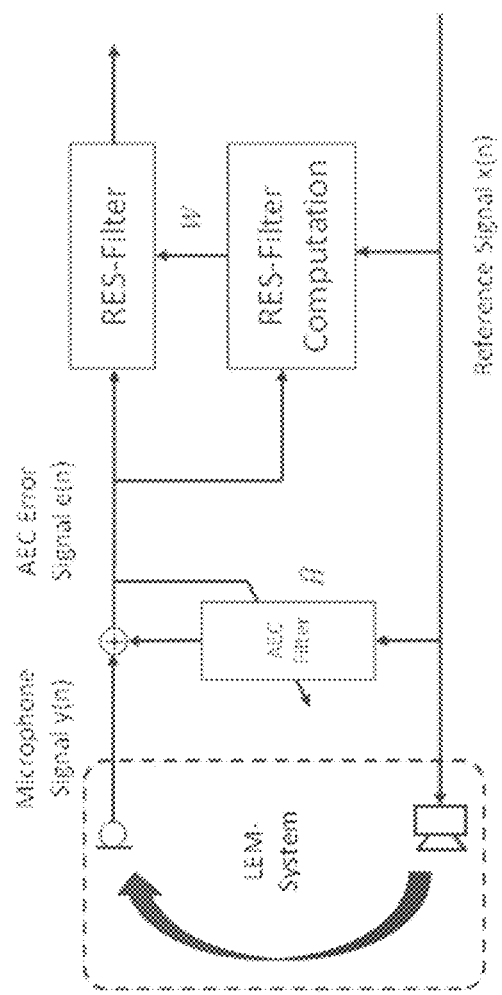
FIG. 4 is an example diagrammatic view of an LEM system according to one or more example implementations of the disclosure.

Generally, if the electro-acoustic components (e.g., both the loudspeaker and the microphone) exhibit linear behavior, then there may be a linear relation between the loudspeaker playback signal and the echo component in the microphone. This relationship may be generally referred to as the loudspeaker-enclosure-microphone (LEM) system of SP 10 and may be described by an impulse response h. An example implementation of a LEM system 400 with acoustic echo cancellation filter and residual echo suppression filter that may be used by SP 10 is shown at FIG. 4.

Generally, knowledge of the loudspeaker playback signal (which is referred to as a "reference signal") may allow for predicting the corresponding interfering echo component in the microphone signal if, e.g., the LEM system is known. Under the assumption of a linear, time-invariant (LTI) system of SP 10, an adaptive filter may be applied that aims to estimate the LEM system. AEC (e.g., via SP 10) may use this filter's output signal as an estimate of the echo component and may subtract it from the microphone signal. The resulting signal may be used by SP 10 to optimize the adaptive filter and may thus be called the "error" signal. The error signal may consist of the local signal components (which may encompass speech and noise) and the residual echo that may remain due to an imperfect echo estimate. SP 10 may use an adaptive algorithm to adjust the adaptive filter dynamically to minimize the power of the residual echo. Sophisticated adaptation control may be necessary to control the adaptation step size for the update of the AEC filter coefficients. In particular, a decision logic of SP 10 may be required that detects whether the error signal is dominated by local speech or by residual echo. Generally, in some implementations, filter adaptation by SP 10 is allowed in the latter case only. Compared to suppression-based algorithms, AEC may have the advantage that it generally does not distort the desired near-end speech signal. After initialization or a reset, all filter coefficients may be set to zero, which means that the AEC starts with no knowledge about the room. As soon as a loudspeaker signal is played, adaptation by SP 10 may take place, and the filter may converge.

In practical applications, AEC may achieve up to, e.g., 40 dB of echo attenuation (although more or less echo attenuation may be possible). Imperfect cancellation may result for different reasons. For example, the adaptive filter may not have sufficiently converged yet. As another example, the length of the AEC filter chosen may be too small, so late echo components cannot generally be modelled by the adaptive filter and hence cannot be compensated for (e.g., "under-modelling"). As yet another example, the LEM system may behave in a non-linear fashion, for example, due to undesired signal components in the loudspeaker or saturation effects in the amplifier.

Regarding residual echo suppression, and in practical applications, AEC may generally never work perfectly well and cannot completely cancel the echo from the microphone signal. As a consequence, residual echo remains in the error signal. Residual echo suppression may be applied (e.g., via SP 10) as a post-processing step. Typically, a filter may be calculated dynamically by SP 10 that aims to suppress the residual echo components; however, the filter may also influence the desired near-end speech component, which may lead to undesired signal components in speech. By its nature, any RES filter may need to trade undesired signal components in speech against echo attenuation and vice versa.

In most applications, the RES filter may be realized as a modified Wiener filter that is updated dynamically on a frame basis (e.g., every 10-30 ms or other frame size). The error signal's power spectral density (PSD) may be used by SP 10 to calculate the filter coefficients, as well as an estimate of the interfering signal components.

Both AEC and RES are usually calculated in the frequency domain. For example, the short-time Fourier transform (STFT) may be applied to transform the time domain signal into the frequency domain on a frame-by-frame basis. The frame shift (that is, the time shift between two frames) is typically about 10 to 20 ms, but other time shifts may also be used.

For the following discussion regarding a signal model, assume the following for example purposes only:

Time domain signals:
Microphone signal is y(n)
Reference signal is x(n)
Echo component in the microphone signal is d(n)
Near-end speech component in the microphone signal is s(n)
Noise component in the microphone signal is b(n)
Error signal (after AEC) is e(n)
Residual echo signal is r(n)
Output signal (after RES) is o(n)

Generally, capital letters are used for frequency domain signals and lowercase letters are used for time-domain signals. For example, the reference signal in frequency domain is denoted X(k,l), while in time domain, it displays as x(n). The microphone signal may be composed of the echo D, the local speech S, and the local noise B:

$$Y(k,l)=D(k,l)+S(k,l)+B(k,l)$$

Regarding AEC again, and in some implementations, the adaptive filter H(k,l), may be applied by SP 10 to the reference signal to yield the echo estimate. This may also be accomplished by a convolution in each frequency sub-band in order to model a longer time period for the echo path. The estimated echo may then be subtracted from the microphone signal:

$$E(k,l)=Y(k,l)-X(k,l)*H(k,l)$$

An alternative formulation of the error signal may be:

$$E(k,l)=R(k,l)+S(k,l)+B(k,l),$$

where the residual signal is:

$$R(k,l)=D(k,l)-X(k,l)*H(k,l).$$

Regarding residual echo, the residual echo R(k,l) that remains after AEC generally cannot be observed directly. It may consist of a linear and a non-linear part:

$$R(k,l)=R_{lin}(k,l)+R_{nl}(k,l).$$

The linear component $R_{lin}(k,l)$ may consist of the residual echo due to insufficient convergence of the AEC filter and residual echo due to late echo components that generally cannot be modelled by the AEC filter. The non-linear component $R_{nl}(k,l)$ is the residual echo due to non-linear echo components that generally cannot be modelled by the AEC filter, and may consist of early and/or late components.

Regarding residual-echo suppression, the power spectral density of the residual-echo component $\Phi_R(k,l)$ may need to be estimated:

$\Phi_R(k,l)=E\{|R(k,l)|^2\}$. $E\{.\}$ may denote the statistical expectation operator, and $\Phi_E(k,l)$ may be defined in a similar way.

Residual echo suppression is usually accomplished by dynamic spectral attenuation:

$$O(k,l)=E(k,l)\cdot W(k,l)$$

As used herein, the term for this operation (i.e., residual echo suppression) may generally be used interchangeably with the term "reducing undesired signal components".

Based on the Wiener filter:

$$W(k,l) = 1 - \frac{\Phi_R(k,l)}{\Phi_E(k,l)}.$$

Many different versions of this filter may exist. Most of them have in common that the phase is not modified, hence the filter weights are real valued, such that the main effect of this filter is to apply dynamic spectral amplitude weighting to the error signal. The filter rule is designed to let the desired signal components pass and at the same time suppress the residual echo.

Regarding short echo paths, classically, the residual echo signal has been assumed to consist of linear components only, e.g.:

$$\Phi_R^{classic}(k,l)=\Phi_{R,lin}(k,l).$$

Furthermore, the AEC filter has been assumed to be sufficiently long such that echo components that cannot be modelled due to the finite length of the AEC filter may actually be neglected. This means that the residual echo suppression filter only has to cope with residual echo due to a non-fully converged AEC filter. This approach may be fully sufficient, for example, in car environments with a small reverberation time.

Figure 5:
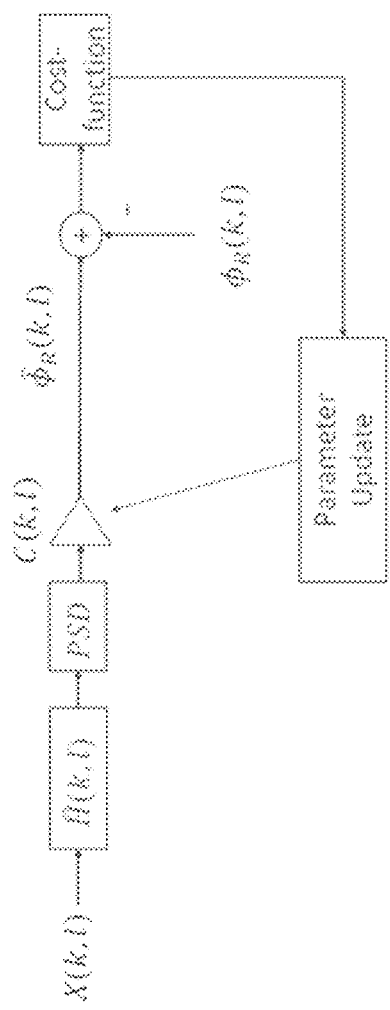
FIG. 5 is an example diagrammatic view of an early residual echo PSD estimation according to one or more example implementations of the disclosure.
Figure 6:
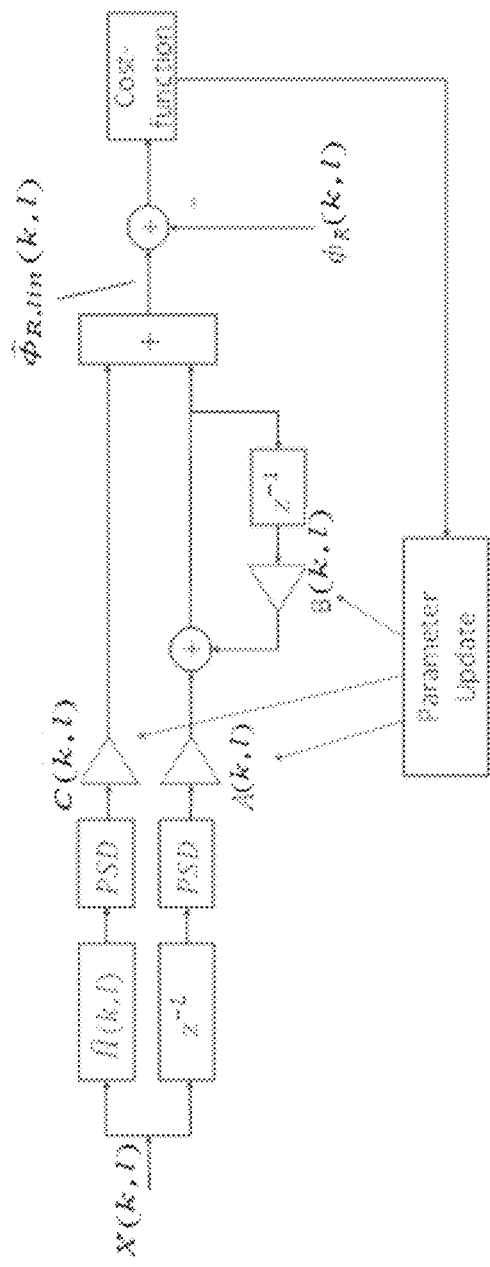
FIG. 6 is an example diagrammatic view of early and late residual echo PSD estimation according to one or more example implementations of the disclosure.
Figure 7:
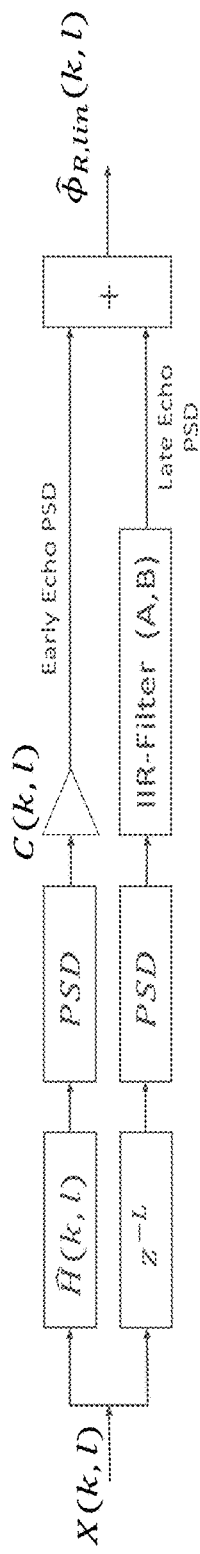
FIG. 7 is an example diagrammatic view of a simplified early and late residual echo PSD estimation according to one or more example implementations of the disclosure according to one or more example implementations of the disclosure.
Figure 8:
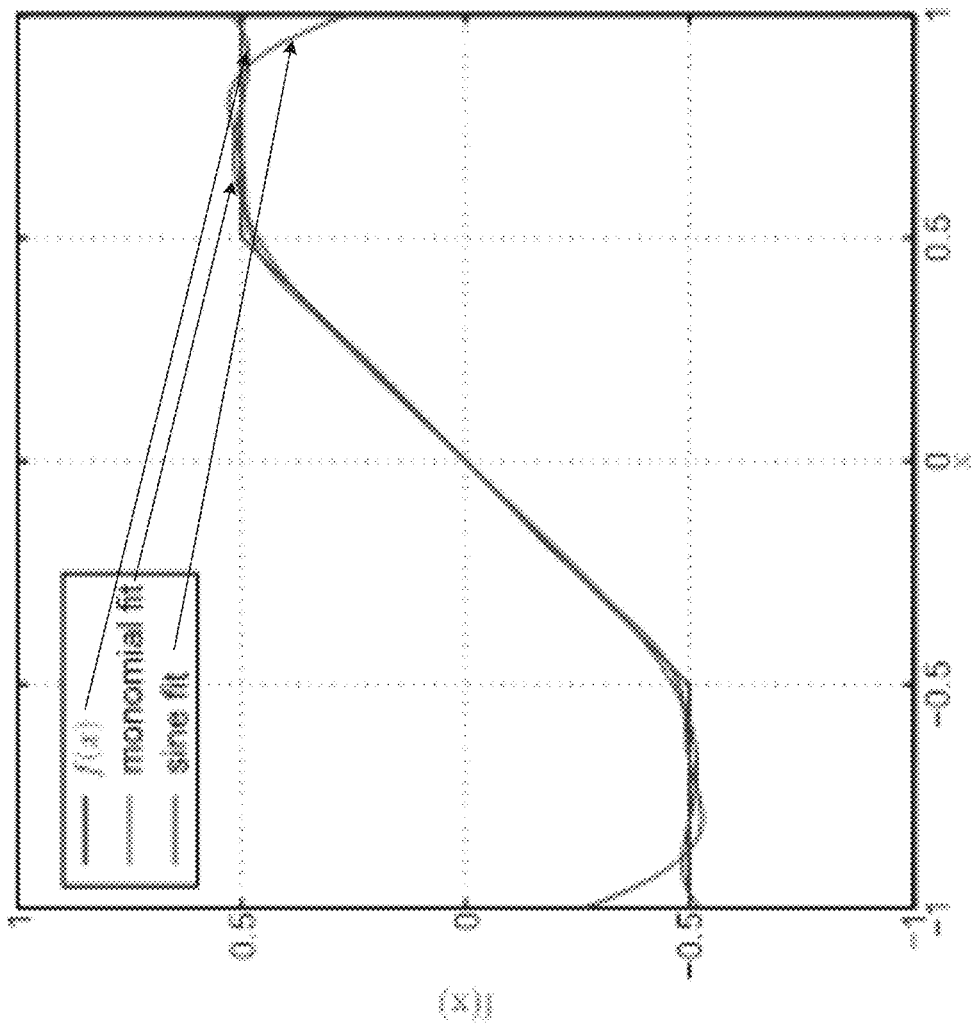
FIG. 8 is an example diagrammatic view of a non-linear clipping function according to one or more example implementations of the disclosure.
Figure 9:
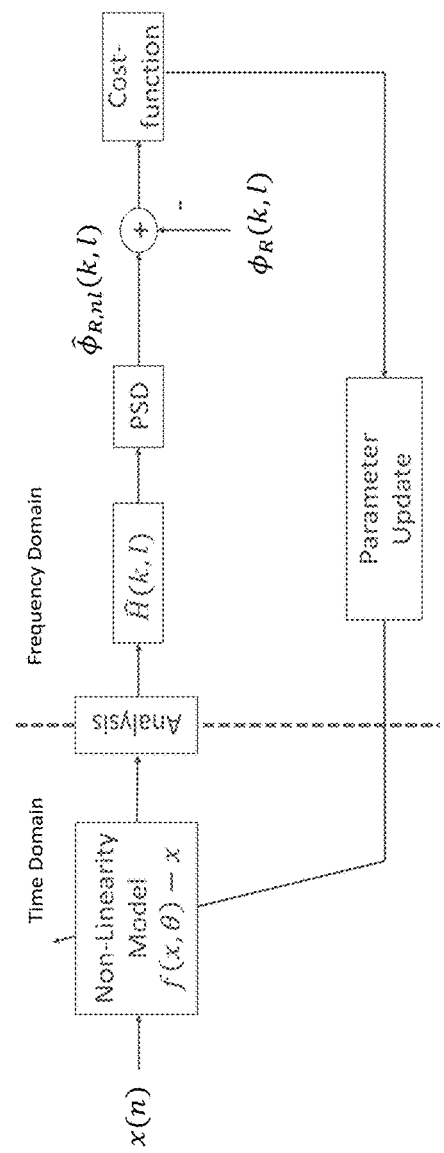
FIG. 9 is an example diagrammatic view of early non-linear residual echo PSD estimation according to one or more example implementations of the disclosure.
Figure 10:
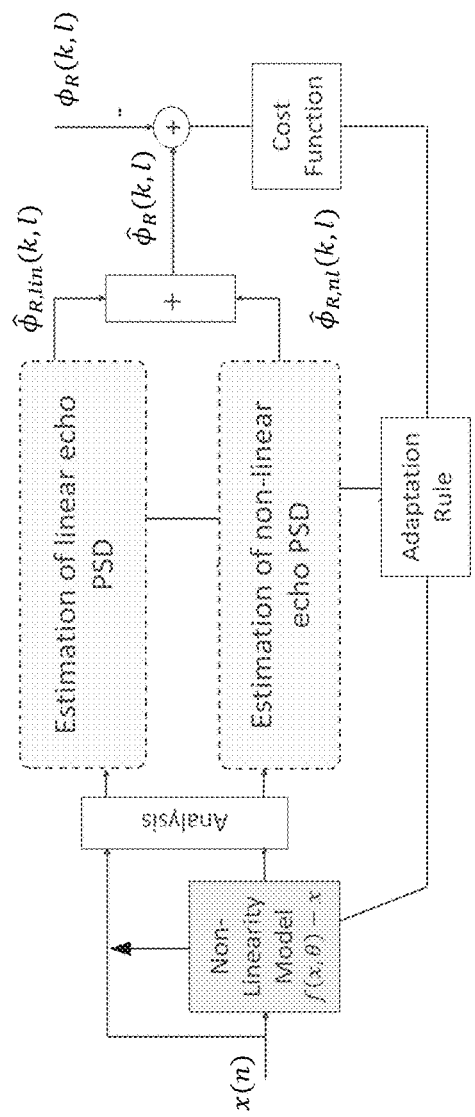
FIG. 10 is an example diagrammatic view of PSD estimation according to one or more example implementations of the disclosure.

Referring at least to the example FIG. 5, a block diagram 500 of a method for estimating the early residual echo PSD is shown. The AEC filter output may be taken as a basis, then the PSD is computed, and finally, a so-called coupling factor C is applied (positive real valued) to adjust the obtained PSD $\tilde{\Phi}_R(k,l)$ to the observed residual echo PSD $\Phi_R(k,l)$, which is generally only possible in speech pauses. This adjustment, or bias removal, may be required because the PSD at the AEC filter output is generally different from the one at the microphone. Several methods are known for the adaptation of the coupling factor C, all of which may operate by minimizing a cost function, for example:

mean squared error, mean squared logarithmic error, the so-called "sign algorithm", or even combinations of those that may be disclosed in E. Hansler, G. U. Schmidt: "*Acoustic Echo and Noise Control—A practical Approach*," Wiley 2004.

Regarding reverberant environments, generally, if AEC filters shall be operated in reverberant spaces, such as living rooms, it may be a straight-forward approach to simply increase the AEC filter length according to the expected length of the room-impulse response(s). This, however, may lead to both an increase in computational complexity and a slower convergence speed. Both effects may be undesired. Therefore, late echo suppression filters have been developed that explicitly model the reverberation. Thereby, the residual echo suppression filter, which may be computationally simple, takes care of the late echo and only the early echo, which is more complicated to model as compared to the late part, is taken care of by the AEC filter. This may, to some degree, introduce additional undesired signal components in speech as compared to a very long and well-converged AEC filter, but constitutes a very feasible compromise in practice.

These residual echo suppression filters may use parametric models to generate the PSD estimates needed to feed the actual suppression filter W(k,l). Referring at least to the example FIG. 6, an example block diagram 600 of a method for estimating both early and late residual echo PSD is shown. In the example, there are two branches: one for estimating the early linear residual PSD (similar to FIG. 5) and a second one for estimating the late linear echo PSD. The latter may introduce a delay of L frames, where L is the length of the sub-band AEC filter. This delayed PSD may then be filtered by an Infinite Impulse Response (IIR) filter structure with two parameters A and B. The parameter B introduces an exponential decay and corresponds to the reverberation time T-60. There may be several algorithms to find the three parameters A, B and C jointly using different cost functions. The Mean-Squared-Log-Error (MSLE) may yield the best results. Referring at least to the example FIG. 7, an example of a simplified block diagram 700 of block diagram 600 is shown where a block for the IIR filter has been introduced for simplicity.

Regarding non-linear systems, and further regarding residual echo suppression for suppressing echoes in non-linear systems, the assumption still was the same as in classical systems, e.g.: the AEC has sufficient length and hence, late echoes may be neglected. For this scenario, estimates of the PSD of the non-linear echo have been described. Those apply a non-linear parametric model function ƒ(x) to the reference signal x(n) in the time domain and then proceed in the frequency domain in order to estimate the PSD $\Phi_{R,nl}(k,l)$. Referring at least to example FIG. 8, an example non-linear clipping function f(x) 800 with the knee-point θ is shown. The function ƒ(x) has been used to produce the non-linearly distorted signal internally. However, and referring at least to the example block diagram 900 of a system for estimating the PSD of the early non-linear residual echo shown in example FIG. 9, not only ƒ(x) has been used but ƒ(x)−x in order to exclude the non-distorted component from the non-linear PSD estimation part. Therefore, the resulting PSD estimate may be zero if no non-linearities are present, which may depend on the choice of θ. Next, the distorted signal may be transformed into the frequency domain and reverberated according to the AEC filter coefficients. Computation of the PSD completes the estimation procedure.

The obtained PSD estimate may be compared to the observed residual echo PSD and the result may be weighted according to a cost function. Finally, the parameter estimate $\hat{\theta}$ may be changed such that the cost is minimized. In principle, different cost functions are possible here too, however practically, the sign of the broadband error may yield good (sufficient) results.

It should be noted, however, that no coupling factor like in the linear system (see FIG. 7) is used here. This may not be required since the non-linear parts are not cancelled by the AEC filter $\hat{H}$. Note further that this system may generally not be able to cope with "under-modelling" due to the AEC filter being significantly shorter than the actual acoustic echo path.

As discussed above, it is not straight forward to simply use both RES systems in parallel when non-linear undesired signal components can be expected in reverberant environments. The reason is that, for example, both systems may be disturbed by the signal components estimated by the respective other system: even if the non-linear RES estimation algorithm succeeded in estimating the PSD of the non-linear echo correctly, this portion would likely lead to a divergence of the linear PSD estimation and vice versa. At first glance, it could be considered straight forward to derive a joint estimation of the linear and non-linear parts. This, however, cannot be expected to yield a feasible solution as the parts of the non-linear model system are in the time domain and moreover non-linear. Therefore, no known closed-form solution for the gradient exists. As discussed below, SP 10 may be used to address this example issue, thereby enabling joint estimation of the linear and non-linear parts.

In some implementations, SP 10 may generate 302 a first power spectral density estimate for a linear reverberant component associated with the input signal, may generate 304 a second power spectral density estimate for a non-linear reverberant component associated with the input signal, and may generate 306 a power spectral density estimate by combining the first power spectral density estimate for the linear reverberant component and the second power spectral density estimate for the non-linear reverberant component. For instance, as will be discussed below, SP 10 may generate an estimate for the residual echo PSD using two parallel systems, with one estimating the linear reverberant component, and the other one estimating the non-linear reverberant component. For instance, and referring at least to the example block diagram 1000 of PSD estimation of FIG. 10 that may be used by SP 10, SP 10 may extend the PSD estimation, where the residual echo PSD may be generated 306 by combining (e.g., the sum of) the separately generated PSDs for linear and non-linear residual echo (e.g., via the linear reverberant component and the non-linear reverberant component), e.g.:

$$\Phi_R(k,l) = \Phi_{R,lin}(k,l) + \Phi_{R,nl}(k,l)$$

In theory, this may not be exactly true, but in practice, this approximation is sufficiently good. In some implementations, a common error PSD may be generated by SP 10 and fed back for adaptation. Both branches may be used to estimate the early and late echo PSD. Hence, the late reverberation model is not only applied in the linear path, but in both the non-linear and the linear part.

In some implementations SP 10 may update 308 one or more parameters for at least one of the linear reverberant component and the non-linear reverberant component. For example, in some implementations, in order to minimize the cost associated with the error PSD, for adaptation of the linear model parameters, the parameter of the non-linear model may be considered time invariant, which may allow for computation of the gradient. This may lead to an adaptation rule for the linear model parameters. In the next frame, the linear model parameters may remain unchanged and the non-linear parameter may be updated 308 using the same or similar rule as in the original non-linear RES algorithm. In some implementations, both steps may be carried out alternating over time.

In some implementations, at least one parameter of the one or more parameters is used to generate the first power spectral density estimate for the linear reverberant component and to generate the second power spectral density estimate for the non-linear reverberant component. For example, SP 10 may focus on the joint usage of some of the parameters (e.g., parameter A and B for modelling the late residual echo parts for both the linear component and the non-linear component). That is, some or all of the same parameters may be used in both estimators (the same model is used for both the estimator for the non-linear echo component and the estimator for the late echo component). For example, regarding generation of the PSD estimates, and referring at least to the example block diagram 1100 of FIG. 11, there is shown the same system as in FIG. 10, with greater detail of the two PSD estimation shown. In the example, the parameters (e.g., A and B) are depicted in both estimators (e.g., block 1102 and block 1104). The upper block (e.g., block 1102) is similar to that shown in FIG. 7. $\Phi_{R,lin}(k,l)$ is hence generated by the same system. The lower block (e.g., block 1104), however, is more than known systems for non-linear PSD estimation. For example, a new processing structure is shown where the non-linear component is modeled with separate parts for early and a late echo. Hence, the same model that is applied during the estimation of $\Phi_{R,lin}(k,l)$ may now also be used to "reverberate" the non-linear parts.

In some implementations, reverberating the non-linear PSD estimate along with fusing it with the linear estimate may enable both systems (e.g., block 1102 and 1104) to benefit from the knowledge learned by the respective other system. This introduces a synergetic coupling between the two systems so they no longer disturb each other, allowing them to be combined (e.g., those parts of the PSD estimate that can be "explained" by the non-linear part may already reduce the error and the linear part may no longer have to explain them). Therefore, they do not appear as an undesired signal component in the error PSD that the linear part sees (and vice versa).

A different but equivalent view on this effect may be that the error PSD used for the adaptation of the linear part is cleaned from the components that can already be explained by the non-linear part. Put another way, it may be looked at that individual error PSDs for the two systems (or subsystems), which ideally are independent of each other, where this decoupling is the desired effect introduced by the described structure in FIG. 11.

Figure 11:
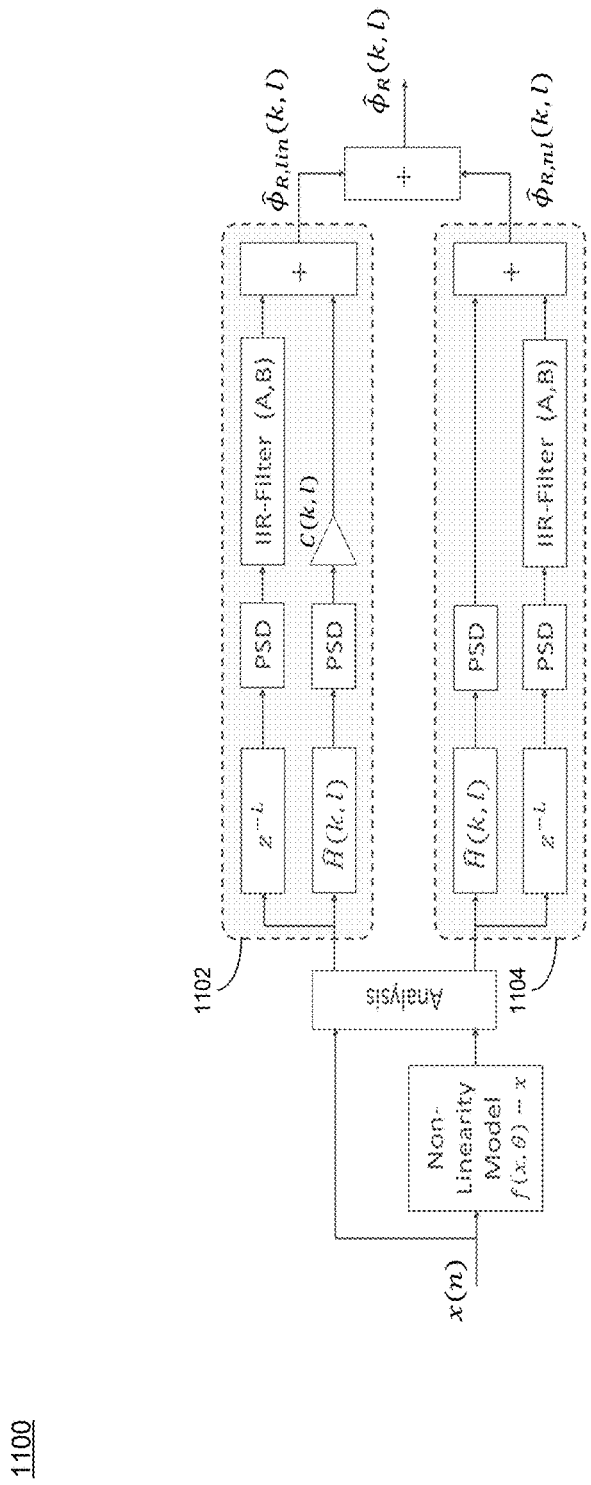
FIG. 11 is an example diagrammatic view of PSD estimation according to one or more example implementations of the disclosure.
Figure 12:
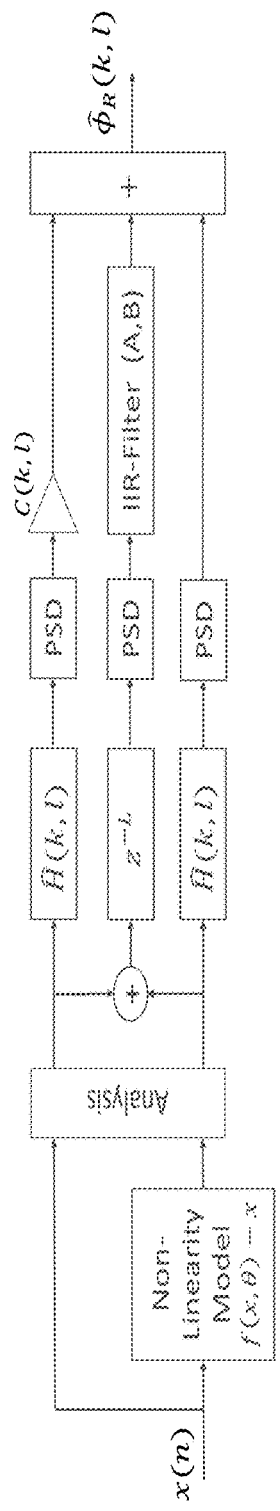
FIG. 12 is an example diagrammatic view of a simplified PSD estimation according to one or more example implementations of the disclosure.

Referring at least to the example implementation of FIG. 12, an equivalent and simplified block diagram 1200 of the system shown in FIG. 11 (block diagram 1100) is shown. In the example, only one IIR filter is computed, which is excited by the sum of linear and non-linear echo PSDs. The two branches (e.g., blocks 1102 and 1104 in FIG. 11) for the early PSDs cannot simply be combined at least because the coupling factor C(k,l) that is only present in the upper branch (e.g., block 1102), which estimates the linear early residual echo PSD) is not present in the lower branch (e.g., block 1104). In some implementations, another task may be to adapt the parameters.

Regarding parameter adaptation, as mentioned above, the overall (e.g., four-dimensional) parameter optimization may be at least difficult to solve in an analytical way, if not impossible. However, if the parameter θ of the non-linear system were static and known, the problem actually becomes solvable. The same is true the other way round (e.g., if the linear reverberation model were given, adaptation of the non-linear system may be carried out by SP 10 in the same way as described above). The adaptation strategy is therefore to update 308 the two sets of parameters separately, and different versions may be possible.

In some implementations, updating 308 the one or more parameters may include alternating 312 updates of the one or more parameters between two frames. For instance, assume for example purposes only that SP 10 may first use a gradient-descent type of update for the parameters of the linear system and treat the parameter of the non-linear part as fixed and known. The resulting update rule is the same as described above. However, it may now be driven by the sum of the linear and the non-linear parts as an input. In the next frame, the parameters of the linear system may be treated by SP 10 as fixed and known. Now the non-linear adaptation may be carried out using the same update rule as noted above.

In some implementations, updating 308 the one or more parameters may include alternating 314 updates of the one or more parameters in one frame. For instance, carrying out the adaptation alternatingly from frame to frame may mean that each part may only be updated every second frame, hence the convergence speed may be decreased. However, in some implementations, SP 10 may carry out both steps in one frame by, e.g., computing the error PSD in the current frame, performing an adaptation step of the non-linear part, re-computing the error PSD using the changed parameter, and comparing the error PSD before and after the change. In the example, if no improvement has been achieved, SP 10 may discard the change and update 308 the linear part without waiting for the next frame to save time. Conversely, if there is an improvement of the error PSD before and after the change, SP 10 may keep the changed non-linear parameter and proceed to the next frame.

In some implementations, updating 308 the one or more parameters may include comparing 316 two or more power spectral density errors and utilizing 318 a power spectral density error of the two or more power spectral density errors resulting in a larger improvement of the output signal. For instance, SP 10 may carry out the adaptation by, e.g., computing the error PSD in the current frame, performing two adaptation steps, such as (1) updating the linear system while keeping the non-linear system fixed, and (2) updating the non-linear system while keeping the linear system fixed (original state before the change in (1)), re-computing both resulting error PSDs, comparing 316 both new error PSDs to the error PSD before the changes, utilizing 318 the change that led to the bigger improvement, and proceeding to the next frame. This may be considered as a "winner takes all" parameter adaptation.

Figure 13:
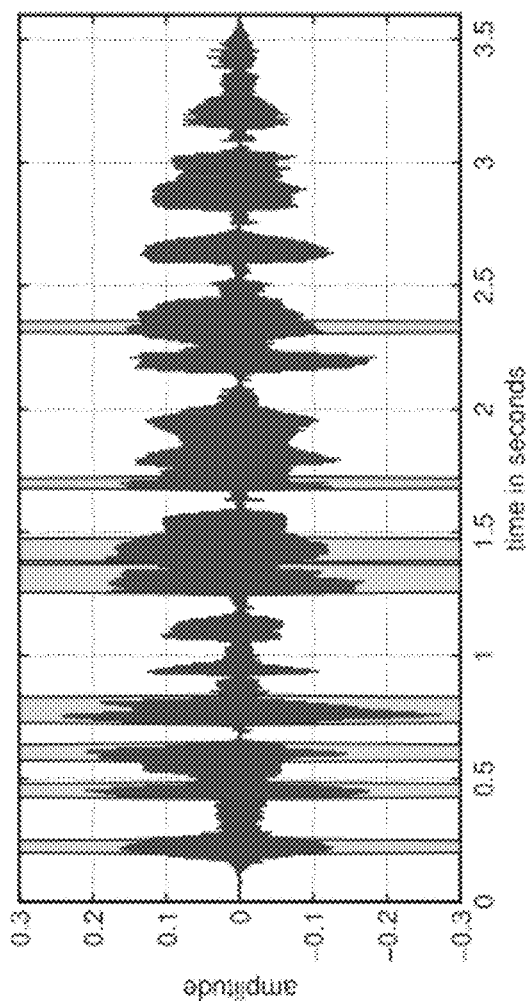
FIG. 13 is an example diagrammatic view of a time segmentation of speech signals according to one or more example implementations of the disclosure.

In some implementations, updating 308 the one or more parameters may be based upon, at least in part, signal properties of the input signal. For instance, assume for example purposes only that the input signal (e.g., speech signal) exhibits a typical amplitude pattern consisting of contiguous loud and quiet parts. Depending on the true parameter θ, louder parts are non-linearly distorted, while quiet parts are only processed linearly. Using these assumptions, SP 10 may use the following example update strategy, e.g., by letting the AEC filter Ĥ converge to a pre-emptive solution, which may be a bit misaligned but stable, calculating the linear coupling factor C(k,l), which may be expected to be higher than for the optimal solution, and approximating the clipping threshold $\hat{\theta}$ to a pre-emptive solution using the linear coupling factor to account for linear residual echo. In the example, since non-linear components may exist in higher frequencies for true undesired signal components, these generally cannot be explained by the linear coupling factor and remain for adaptation of $\hat{\theta}$. With the pre-emptive non-linear parameter estimate, SP 10 may use the non-linearly distorted echo PSD estimate to generate time segmentation information that indicates whether any distorted echo is present in the current frame or not. An example time segmentation 1300 of speech signals is shown in FIG. 13.

SP 10 may utilize the obtained time segmentation information to impede the linear RIR adaptation and linear coupling factor estimation in time segments with undesired signal components. SP 10 may then only adapt on linear echo and converge to a good solution. Based on the improved RIR estimate, SP 10 may continue the adaptation of the clipping threshold. When a stable solution is found, SP 10 may also update further parameters of the non-linear model such as the softness parameter.

In some implementations, SP 10 may reduce 310, via residual echo suppression, one or more undesired signal components (e.g., early or late non-linear echo, late linear echo, residual linear echo, etc.) in an output signal resulting from the input signal based upon, at least in part, updating the one or more parameters. For instance, the example block diagram 1000 of PSD estimation structure in FIG. 10 may now give access to the power ratio between the linear and the non-linear late echo PSD. Such information is not known to have been available before, and may be used by SP 10 in the algorithmic components that may be applied after the AEC or RES module (for example, speech dereverberation) in order to increase robustness, thereby reducing 310 one or more undesired signal components in the output signal.

In some implementations, SP 10 may feed the information on the presence of non-linear undesired signal components back to the adaption of the AEC filter. In particular, spectral or broadband control information may be provided to the AEC by SP 10. This may help to make the overall system more robust. For instance, if this were not done, the AEC filter may try to explain parts of the non-linear undesired signal components, which may lead to divergence.

In some implementations, SP 10 may cease 320 adaptation of an acoustic echo cancellation filter when the one or more undesired signal components are present in the non-linear reverberant component. The rationale here is to stop updating linear parameters if nonlinear behavior is observed or predicted. For instance, SP 10 may stop the adaptation of the AEC filter based on the gathered information about the presence of non-linear undesired signal components, such that adaptation to non-linear signal components is prevented. Generally, concerning the update of parameters, the "adaptation rule" (e.g., the algorithm that may be applied to get a better fit of the parameters, for example, based on the gradient descent of an optimization criterion) may be distinguished from the "adaptation control," which may permit or block (cease) an adaptation step based on the acoustic conditions.

In some implementations, SP 10 may utilize 322 a power ratio between the linear reverberant component and the estimate for the non-linear reverberant component as control information. For instance, SP 10 may evaluate the non-linear-to-linear late echo PSD and use it as control information for other algorithmic components, such as dereverberation.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   receiving, by a computing device, an input signal;
   generating a first power spectral density estimate for a linear reverberant component associated with the input signal, wherein the linear reverberant component comprises a first late reverberant component;
   generating a second power spectral density estimate for a non-linear reverberant component associated with the input signal, wherein the non-linear reverberant component comprises a second late reverberant component;
   generating a power spectral density estimate by combining the first power spectral density estimate for the linear reverberant component and the second power spectral density estimate for the non-linear reverberant component;
   updating one or more parameters for at least one of the linear reverberant component and the non-linear reverberant component; and
   reducing, via residual echo suppression, one or more undesired signal components in an output signal resulting from the input signal based upon, at least in part, updating the one or more parameters.

2. The computer-implemented method of claim 1 wherein updating the one or more parameters includes alternating updates of the one or more parameters between two frames.

3. The computer-implemented method of claim 1 wherein updating the one or more parameters includes alternating updates of the one or more parameters in one frame.

4. The computer-implemented method of claim 1 wherein updating the one or more parameters includes:
   comparing two or more power spectral density errors; and
   utilizing a power spectral density error of the two or more power spectral density errors resulting in a larger improvement of the output signal.

5. The computer-implemented method of claim 1 wherein at least one parameter of the one or more parameters is used to generate both the first power spectral density estimate for the linear reverberant component and the second power spectral density estimate for the non-linear reverberant component.

6. The computer-implemented method of claim 1 further comprising ceasing adaptation of an acoustic echo cancellation filter when the one or more undesired signal components are present.

7. The computer-implemented method of claim 1 further comprising utilizing a power ratio between the linear reverberant component and the estimate for the non-linear reverberant component as control information.

8. A computer program product residing on a computer readable storage medium having a plurality of instructions stored thereon which, when executed across one or more processors, causes at least a portion of the one or more processors to perform operations comprising:
   receiving an input signal;
   generating a first power spectral density estimate for a linear reverberant component associated with the input signal, wherein the linear reverberant component comprises a first late reverberant component;
   generating a second power spectral density estimate for a non-linear reverberant component associated with the input signal, wherein the non-linear reverberant component comprises a second late reverberant component;
   generating a power spectral density estimate by combining the first power spectral density estimate for the linear reverberant component and the second power spectral density estimate for the non-linear reverberant component;
   updating one or more parameters for at least one of the linear reverberant component and the non-linear reverberant component; and
   reducing, via residual echo suppression, one or more undesired signal components in an output signal resulting from the input signal based upon, at least in part, updating the one or more parameters.

9. The computer program product of claim 8 wherein updating the one or more parameters includes alternating updates of the one or more parameters between two frames.

10. The computer program product of claim 8 wherein updating the one or more parameters includes alternating updates of the one or more parameters in one frame.

11. The computer program product of claim 8 wherein updating the one or more parameters includes:

comparing two or more power spectral density errors; and
utilizing a power spectral density error of the two or more power spectral density errors resulting in a larger improvement of the output signal.

12. The computer program product of claim 8 wherein at least one parameter of the one or more parameters is used to generate both the first power spectral density estimate for the linear reverberant component and the second power spectral density estimate for the non-linear reverberant component.

13. The computer program product of claim 8 wherein the operations further comprise ceasing adaptation of an acoustic echo cancellation filter when the one or more undesired signal components are present.

14. The computer program product of claim 8 wherein the operations further comprise utilizing a power ratio between the linear reverberant component and the estimate for the non-linear reverberant component as control information.

15. A computing system including one or more processors and one or more memories configured to perform operations comprising:
receiving an input signal;
generating a first power spectral density estimate for a linear reverberant component associated with the input signal, wherein the linear reverberant component comprises a first late reverberant component;
generating a second power spectral density estimate for a non-linear reverberant component associated with the input signal, wherein the non-linear reverberant component comprises a second late reverberant component;
generating a power spectral density estimate by combining the first power spectral density estimate for the linear reverberant component and the second power spectral density estimate for the non-linear reverberant component;
updating one or more parameters for at least one of the linear reverberant component and the non-linear reverberant component; and
reducing, via residual echo suppression, one or more undesired signal components in an output signal resulting from the input signal based upon, at least in part, updating the one or more parameters.

16. The computing system of claim 15 wherein updating the one or more parameters includes alternating updates of the one or more parameters between two frames.

17. The computing system of claim 15 wherein updating the one or more parameters includes alternating updates of the one or more parameters in one frame.

18. The computing system of claim 15 wherein updating the one or more parameters includes:
comparing two or more power spectral density errors; and
utilizing a power spectral density error of the two or more power spectral density errors resulting in a larger improvement of the output signal.

19. The computing system of claim 15 wherein at least one parameter of the one or more parameters is used to generate both the first power spectral density estimate for the linear reverberant component and the second power spectral density estimate for the non-linear reverberant component.

20. The computing system of claim 15 wherein the operations further comprise at least one of ceasing adaptation of an acoustic echo cancellation filter when the one or more undesired signal components are present and utilizing a power ratio between the linear reverberant component and the estimate for the non-linear reverberant component as control information.

* * * * *